US012391611B2

(12) United States Patent
Sceats et al.

(10) Patent No.: US 12,391,611 B2
(45) Date of Patent: Aug. 19, 2025

(54) POWDER-GAS HEAT EXCHANGER AND APPLICATIONS THEREOF

(71) Applicant: CALIX LTD, Pymble (AU)

(72) Inventors: Mark Geoffrey Sceats, Pymble (AU); Adam Vincent, Pymble (AU); Matthew Gill, Pymble (AU); Simon Thomsen, Pymble (AU); Phil Hodgson, Pymble (AU)

(73) Assignee: CALIX LTD, Pymble (AU)

( * ) Notice: Subject to any disclaimer, the term of this patent is extended or adjusted under 35 U.S.C. 154(b) by 157 days.

(21) Appl. No.: 17/919,681

(22) PCT Filed: Apr. 1, 2021

(86) PCT No.: PCT/AU2021/050301
§ 371 (c)(1),
(2) Date: Oct. 18, 2022

(87) PCT Pub. No.: WO2021/212167
PCT Pub. Date: Oct. 28, 2021

(65) Prior Publication Data
US 2023/0159388 A1    May 25, 2023

(30) Foreign Application Priority Data
Apr. 20, 2020   (AU) ................... 2020901247

(51) Int. Cl.
*C04B 7/47*       (2006.01)
*C04B 7/43*       (2006.01)
(Continued)

(52) U.S. Cl.
CPC .............. *C04B 7/475* (2013.01); *C04B 7/432* (2013.01); *F27B 7/2016* (2013.01); *F27D 17/10* (2025.01);
(Continued)

(58) Field of Classification Search
CPC . C04B 7/475; C04B 7/432; C04B 7/02; F27B 7/2016; F27D 17/004; F27D 2017/009; F27D 17/10; F27D 17/25; F27D 13/00; F28C 3/14; F28C 3/12; B33Y 80/00; F28D 13/00; B01J 2/00; B01J 6/004;
(Continued)

(56) References Cited

U.S. PATENT DOCUMENTS 3,135,588 A * 6/1964 Helming ................... C04B 7/44
                                                    34/59
3,423,840 A    1/1969 Beeken
(Continued)

FOREIGN PATENT DOCUMENTS

GB         673127       6/1952

*Primary Examiner* — Steven B McAllister
*Assistant Examiner* — Benjamin W Johnson
(74) *Attorney, Agent, or Firm* — David R. Stevens; Stevens Law Group (57) ABSTRACT

The invention provides a powder-gas heat exchanger for exchanging heat between a powder stream and a gas stream in counter-current flow comprising a powder stream mass flow rate substantially equal to a gas stream mass flow rate in a vertical shaft heat exchanger. A hot gas stream may be adapted for use in heating a cool solids stream, or a cool gas stream may be adapted for use in cooling a hot solids stream.

7 Claims, 6 Drawing Sheets

(51) Int. Cl.
*F27B 7/20* (2006.01)
*F27D 17/10* (2025.01)
*F28C 3/14* (2006.01)
*B01J 2/00* (2006.01)
*B01J 6/00* (2006.01)
*B01J 8/08* (2006.01)
*B01J 8/12* (2006.01)
*B33Y 80/00* (2015.01)
*C04B 7/02* (2006.01)
*F27D 13/00* (2006.01)
*F27D 17/25* (2025.01)
*F28C 3/12* (2006.01)
*F28D 13/00* (2006.01)

(52) U.S. Cl.
CPC . *F28C 3/14* (2013.01); *B01J 2/00* (2013.01); *B01J 6/004* (2013.01); *B01J 8/087* (2013.01); *B01J 8/12* (2013.01); *B01J 2208/00026* (2013.01); *B01J 2208/00548* (2013.01); *B01J 2208/00752* (2013.01); *B01J 2208/00761* (2013.01); *B33Y 80/00* (2014.12); *C04B 7/02* (2013.01); *F27D 13/00* (2013.01); *F27D 17/25* (2025.01); *F27M 2003/02* (2013.01); *F28C 3/12* (2013.01); *F28D 13/00* (2013.01)

(58) Field of Classification Search
CPC ............... B01J 8/12; B01J 2208/00026; B01J 2208/00548; B01J 2208/00752; B01J 2208/00761; B01J 8/087; F27M 2003/02
USPC ........................................................ 432/117
See application file for complete search history.

(56) References Cited

U.S. PATENT DOCUMENTS

| | | |
|---|---|---|
| 3,741,715 A | 6/1973 | Sylvest |
| 3,964,922 A * | 6/1976 | Nishida ................. F27B 7/2033 106/759 |
| 5,044,942 A * | 9/1991 | Chatwani .................. C04B 7/45 432/100 |
| 5,188,668 A * | 2/1993 | Litka ....................... F27B 1/005 106/739 |
| 6,000,145 A | 12/1999 | Touborg |
| 2017/0320774 A1 * | 11/2017 | Sceats ..................... B01J 6/004 |

* cited by examiner

POWDER-GAS HEAT EXCHANGER AND APPLICATIONS THEREOF

TECHNICAL FIELD

The present invention relates broadly to the means of transferring heat between a powder stream and a gas stream. More particularly, the transfer of heat between streams may be facilitated in a calciner, gas-preheater system, or a flash calciner for improvement of energy efficiency in materials processing.

The project leading to this application has received funding from the European Union's Horizon 2020 research and innovation programme under grant agreement No. 654465.

BACKGROUND

The transfer of heat between a powder stream and a gas stream is common to many industrial processes, especially minerals calcination, roasting processes, and the production of materials such as Portland Cement.

In many processes, a hot powder product is required to be cooled for handling, and the heat is used to preheat an input powder feed to the process to minimise the energy consumption in the reactor. This process may be accomplished using two coupled powder-gas heat exchangers. Thus, a cool gas stream, generally air, may be mixed with the hot powder product in a first heat exchanger, and the heated air is then mixed with the cold input powder to preheat the powder in a second heat exchanger for injection into the reactor. However, generally this system has a poor thermal efficiency because the gas and solids are entrained in a co-flow so that the temperature of the exhaust solids and gas are the same, and at the heat capacity weighted average temperature of the inputs and outputs. The hot solids from the first heat exchanger are only partly-cooled, and there is significant thermal energy left in the gas exhaust from the second heat exchanger. The origin of this poor efficiency is the inherent co-flow of the powder and gas streams arising from the gas-particle friction. There is a need to improve the heat transfer efficiency of this process.

In practise, the known art to overcome this poor efficiency, is that a heat exchanger is segmented into a number (N) of co-flow segments, where the powder flows downwards from segments 1 to N under gravity, and is incrementally heated or cooled by gas flowing upwards from segments N to 1, where the gas is then incrementally cooled or heated. It follows that the efficiency of such a segmented co-flow system approaches that of an ideal counter-flow system as N becomes large. For example, in common processes for production of Portland Cement, segments of the heat exchanger may be a suspension cyclone in which the powder is entrained in the gas flow, and then separated in a cyclone with the powder flowing downwards and the separated gas flowing upwards. The has flow is a mixture of combustion gas of the calciner tower and the rotary kiln, and excess heated air from the clinker cooler that has not been used for the combustion process. Thus the downflowing particles are incrementally heated as they fall, and the upflowing gas is incrementally cooled in each stage. It has been found that a sufficiently good heat exchange can be achieved with N=5, and the incremental cost of adding a $6^{th}$ suspension cyclone typically does not yield a sufficient increase in energy efficiency to warrant another stage. The loss of powder in the gas stream is typically about 7-9%, which is achieved by using a suspension cyclone for each stage with gas velocities in the order of 15 m/s or more for a process in which the mass flows of gas and powder are about equal. The similarity of the mass flows is a generic requirement for efficient heat exchangers, where the heat capacities of the powder and gas are similar on a mass basis. These systems are characterised by a high wear of the cyclone materials, and the torturous path of the gas and powder flows in an N cyclone stack means that the mass of steel and refractory are considerable, and costly. Indeed, the size of the heat exchange stack exceeds that of calciner reactor by an order of magnitude.

There is a need for a powder-gas heat exchanger that overcomes the limitations of conventional co-flow powder-gas heat exchangers in general, and specifically the need to use segmented co-flow systems.

The object of the present invention may be to provide an improvement over the heat transfer between a powder stream and a gas stream.

Any discussion of the prior art throughout the specification should in no way be considered as an admission that such prior art is widely known or forms part of common general knowledge in the field.

SUMMARY

Problems to be Solved

It may be advantageous to provide a heat exchange system and/or method for efficiently exchanging heat between a powder stream and a gas stream.

It may be advantageous to provide for a more energy efficient system relative to that known in the art.

It may be an object of the invention to improve the performance of known reactor systems that require cooling of a powder product and preheating of a powder feed to the reactor.

It may be an object of the invention to simplify the production of Portland Cement by replacing a N-stack segment co-flow process for pre-heating the cement raw meal powder by a single stage process of similar thermal efficiency.

The invention described herein may address at least one of the aforementioned issues of efficiency, of complexity and of cost of existing powder-gas heat exchangers.

Means for Solving the Problem

The present disclosure may be directed towards a method for exchanging heat between a powder and a gas. In this aspect the solids may be either hotter or cooler than that gas.

According to a first aspect, the invention provides a powder-gas heat exchanger for exchanging heat between a powder stream and a gas stream in counter-current flow comprising a powder stream mass flow rate substantially equal to a gas stream mass flow rate in a vertical shaft heat exchanger.

The powder-gas heat exchanger preferably comprises a hot gas stream adapted for use in heating a cool solids stream, or a cool gas stream adapted for use in cooling a hot solids stream, wherein the hot gas stream comprises hot air or hot gas produced from a process, and the cool gas stream comprises air.

In a preferred embodiment, the powder-gas heat exchanger comprises a gas injection stage wherein a gas is injected near the base of the shaft in a diffuser tube so as to create a rising gas stream; a powder disperse stage comprising a first length of the shaft in which the powder from the powder injection stage disperses across the shaft; a mixing stage wherein powder from the powder disperse stage and gas from the gas injection stage flow in contact to exchange heat; a powder hopper stage at the base of the heat exchanger wherein powder falling past the gas injection stage accumulates as a powder waste product, wherein the powder waste product is exhausted from the heat exchanger by a valve; a separation stage at the top of the diffuser tube which substantially separates the gas from any entrained solids, wherein the solids are reinjected downwards into the diffuser tube, wherein the gas exhausts from the reactor in a manner which does not substantially impact on the dispersal of the powder below.

In one embodiment, a velocity of the powder entering the powder-gas heat exchanger from the powder injection stage, and a velocity of the rising gas from the gas injection stage are selected to minimise recirculation of powder in the mixing stage, such that the falling powder stream and the rising gas stream are substantially in contacting counterflow in the mixing stage.

In a second aspect of the invention, a reactor for processing powder comprises two or more of the powder-gas heat exchangers to recover heat from an exhaust stream from one or more reactor stages and using the heat to preheat an input powder stream to optimise the thermal energy efficiency of the reactor stages.

In one embodiment, a reactor comprises a first powder-gas heat exchanger to cool a hot powder from a reactor stage with a cool gas stream; a second powder-gas heat exchanger injecting an output hot gas stream from the first powder-gas heat exchanger, to preheat a cool powder for injection into the reactor stages as a preheated powder stream, wherein the reaction does not generate a substantial process gas stream and combustion gas is not injected into the reactor stages.

In a preferred embodiment, a reactor comprises a first powder-gas heat exchange to cool a hot powder from a reactor stage with a cool gas stream; a means of separating a cool powder feed into a first and second cool powder input stream, wherein a mass flow of the first cool input powder stream is in proportion of a mass flow of hot powder exhaust to a hot powder and a hot gas stream from the reactor stages, or in a proportion of a heat capacity weighted mass flow of hot powder exhaust to a heat capacity weighted hot powder and hot process gas streams; a second powder-gas heat exchanger wherein an output hot gas stream from the first powder-gas heat exchanger is used to preheat a first cool input powder stream for injection into the reactor stage as a preheated powder stream; a third powder-gas heat exchanger wherein a hot process gas output stream from the reactor stage is used to preheat a second cool input powder stream for injection into the reactor stage as a preheated powder stream, wherein the reaction generates a substantial process gas stream and combustion gas is not injected into the reactor stages.

In another embodiment, a reactor comprises a first powder-gas heat exchanger to cool a hot powder from the reactor stage with a cool gas stream; a means of separating a mixed hot process and combustion gas stream from the reactor stages into a first and second hot gas stream in which the mass flow of the first hot gas stream is in proportion of a mass flow of a process gas generated in the reactor to a mass flow of the total gas stream from the reactor stage, or in proportion of a heat capacity weighted mass flow of a process gas to a heat capacity weighted total gas stream from the reactor stages; a means of separating a cool powder feed into a first and second cool powder input stream, in which a mass flow of the first cool input powder stream is in proportion of a mass flow of hot powder exhaust to a hot powder and hot process gas streams from the reactor stages, or in proportion of a heat capacity weighted mass flow of hot powder exhaust to a heat capacity weighted hot powder and hot process gas streams; a second powder-gas heat exchanger wherein an output hot gas stream from the first powder-gas heat exchanger is used to preheat a first cool input powder stream for injection into the reactor stages as a preheated powder stream; a third powder-gas heat exchanger wherein a first hot gas stream from the reactor stages is used to preheat a second cool input powder stream for injection into the reactor stages as a preheated powder stream; a gas-gas heat exchanger wherein air for a combustion process is preheated by a second hot gas stream from the reactor stages wherein the reaction generates a substantial process gas stream and combustion gas is injected into the reactor stages The reactor preferably incorporates the powder-gas heat exchangers within any of the reactor stages.

In a particularly preferred embodiment, the reactor is applied to the production of Portland cement.

The heat exchanger of the first aspect comprises stages which enables a counter-flow of a rising gas and falling powder, with a minimum entrainment of the solids in the exhaust gas which is not more than about 7% and a heat exchange efficiency within 90% or more of that of an ideal counterflow heat exchanger.

Another aspect of the present disclosure may relate to the application of the invention to a reactor process in which the reaction processes do not generate a significant gas stream. This aspect may comprise two such powder-gas heat exchanger subsystems, in which a first powder-gas heat exchanger subsystem is used to cool a powder from a reactor subsystem using ambient air, and the hot gas from the first powder-gas heat exchanger subsystem is used in the second powder-gas heat exchanger subsystem to preheat an ambient powder for injection into a reactor subsystem. This heat exchange system is in addition to any gas-gas heat exchanger for preheating air from the combustion gas, if any.

A further aspect of the present disclosure may relate to the application of the invention to a reactor process in which the reaction processes generate a significant hot gas stream. This aspect may comprise three such powder-gas heat exchangers in which a first powder-gas heat exchanger subsystem is used to cool the powder from a reactor subsystem using ambient air, and the hot gas from the first powder-gas heat exchanger subsystem is used to preheat a fraction of the ambient powder for injection into a reactor subsystem, and a third powder-gas heat exchanger subsystem is used to cool the exhaust gas from a reactor subsystem by injection of the second fraction of the ambient powder into this gas stream.

In yet another aspect of the present disclosure may be directed towards a reactor process in which the reaction processes generates a significant hot gas stream that is mixed with a combustion gas. This aspect comprises three such powder-gas heat exchanger subsystems and a gas-gas heat exchanger subsystem, in which a first system is used to cool the powder from a reactor using ambient air, and the hot gas from this first powder-gas heat exchanger subsystem is used in the second powder-gas heat exchanger subsystem to preheat a fraction of the ambient powder for injection into a reactor, and a third powder-gas heat exchanger subsystem is used to cool a fraction of the exhaust gas from the reactor by injection of the second fraction of the ambient powder into this gas stream; and a gas-gas heat exchanger is used to preheat the air from the other fraction of the exhaust gas for use in the combustor processes.

In yet a further aspect of the of the present disclosure may relate to the application of the invention to the production of Portland cement.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

BRIEF DESCRIPTION OF THE FIGURES

Embodiments of the invention will be better understood and readily apparent to one of ordinary skill in the art from the following written description, by way of example only, and in conjunction with the drawings, in which.

DESCRIPTION OF THE INVENTION

Preferred embodiments of the invention will now be described by reference to the accompanying drawings and non-limiting examples.

Conventional or known systems may use a mixture of gas and powder having different temperatures and about equal mass flow generally leads to entrainment of the powder in the gas. Thus, the heat exchangers are likely to be co-flow. The rate of heat transfer between the powder and the gas is relatively fast, typically milliseconds for a well-mixed system, so that the heat transfer is relatively efficient but the co-flow of the gas and powder leads to the exhaust gases having the same temperature, such that the thermal efficiency is low compared to an ideal counterflow heat exchanger. This invention discloses the means whereby a substantially counterflow of gas and powder may be achieved within the heat exchanger wherein the benefits of a fast gas-solids heat transfer are retained but with a high thermal efficiency.

The structure of the heat exchanger described herein is a thermally insulated vertical shaft in which the gas rises against the falling powder. The shaft may be a thermally insulated pipe. This design uses the gravitational force of the powder to drive the downwards flow of the powder.

For example, for a powder falling down a tube against a rising gas, a uniform rising gas can generally entrain a large volume of powder or a large mass of powder compared to the weight of the uniform gas, and in many practical applications of pneumatic conveying, the mass flow of powder may be a factor of 5-10 times the gas mass flow. Typically, in solids, conveying is that all the particles will be swept up in the gas if the gas velocity is higher than the terminal velocity of the particles in a quiescent gas. In this case, there is limited to no possibility of a counterflow of the gas and the particles. The critical factor for realisation of a counterflow, required to give efficient heat transfer, is to ensure that the gas flow is non-uniform in order to suppress such entrainment of the powder.

Conveying powder or other particulate materials commonly utilises methods for entrainment of powder in a uniform gas flow in a tube at a given velocity will cease when the mass flow of powder achieves a condition known as choking. There are empirical relationships that are used to evaluate the mass flow of powder that can be lifted in a gas flow of a given velocity. When choking occurs, the gas and solids flows cease to become uniform, and complex flow patterns of the solids and gas are developed, and therefore a counterflow of solids develops. This is generally associated with a flow of particles down the wall of the tube where the gas velocity is low. This is a region of turbulent flow of the mixed gas and solids, which is to be avoided when conveying solids. An insight into the physical mechanism of the choking is that the particles develop transient streamers, of, for example, forty or more particles that can flow downwards against the rising gas because they move as one particle of a larger mass in a stream as that lowers the gas-particle friction.

In one embodiment, it may be an object to purposefully create such a system of turbulence so that a flow of particles injected into the tube at the top is not entrained, and the desired counterflow is established. In this way, turbulence may be generated by injecting the solids into the heat exchanger through a small injector tube opening at the top of the pipe to form a plume of powder in the tube. The initial free-fall plume of powder exhausting from the opening accelerates under gravity and the plume dilates, and pulls gas from the surroundings into the plume. This gas limits the acceleration, and the plume slows and broadens, and eventually breaks up. Experiments on freely falling plumes show that, as the plume dilates, the powder breaks up into large clouds of clustered particles. The theory developed in that work can be applied to the case in which the plume is a slowly rising gas.

This process that underpins at least one embodiment of the present disclosure is that the "clouds" of particles in the plume further break up into streamers of particles that have a sufficiently low gas-streamer friction that they have sufficient momentum continue in a downward trajectory against the rising gas even after the plume has dissipated, such that only a small fraction of powder particles are entrained in the rising gas, and the number of particles in the streamers are sufficiently small, that they efficiently transfer heat to the gas. For typical powders, the plume launched at the superficial velocity at the entry point will break up after several meters of travel, and the penetration depth of the plume before the break-up increases with the entrance velocity. Simply put, the plume generates streamers of particles that flow down against the rising gas, and the streamers and gas efficiently exchange heat as they pass. In addition, the particles that are entrained in the gas may be ejected back into the shaft so that the net momentum of falling particles increases as this hold-up increases. In order to maximise the counterflow heat transfer, it is an object of this invention to minimise the recirculation of particles.

When cold powder is injected downwards as a plume into a rising gas hot gas in the shaft, it has been found that, provided that the gas velocity is not too large, and the plume entry velocity is not too large, that a very good heat exchange takes place with only a small entrainment of gas. These experiments have been validated by computational fluid dynamics simulations that provide for hydrodynamically induced streamer formation.

Figure 1:
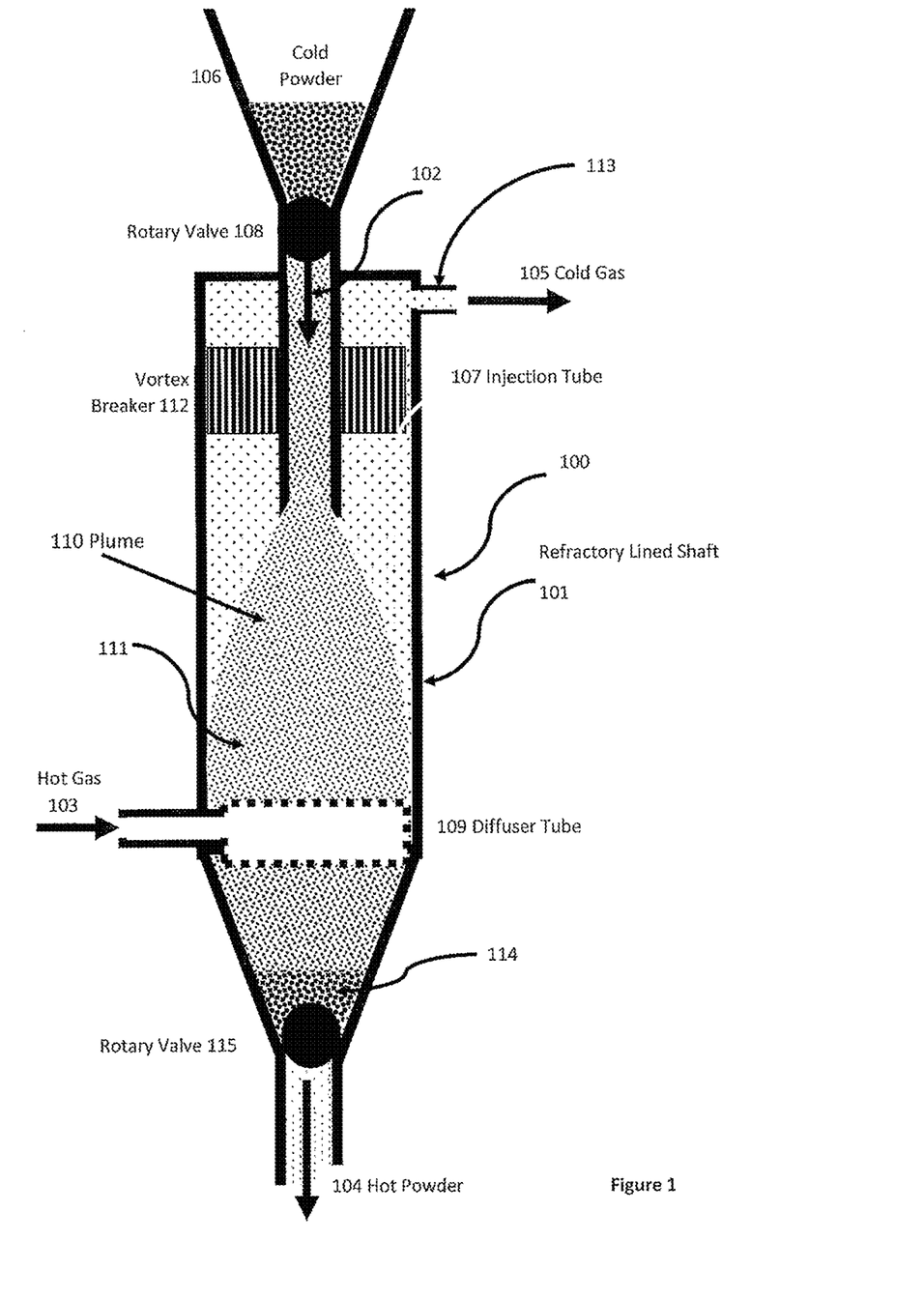
FIG. 1 illustrates a schematic of an embodiment of a powder-gas heat exchange system of the present disclosure of the first aspect.

In the example embodiment of FIG. 1 a heat exchanger system 100 is shown for the case where a hot gas is used to heat a cold powder in a refractory lined shaft 101. The mass flows of the powder and gas are approximately the same, or more correctly, the heat capacity weighted mass flows are the same, so that well-established conditions for an efficient heat exchanger are set by the mass flows. In this embodiment, a cold powder flow 102 (usually at ambient temperature) is heated by a hot gas flow 103 to give a heated solid output flow 104 and a cooled gas output flow 105. The cold powder flow is formed in a hopper 106 and is injected into an injector tube 107 using a valve system 108. The hot gas flow is injected into the shaft using a diffuser tube 109 near the base of the pipe. The ambient powder flow enters the pipe as a plume 110, and further accelerates downwards drawing in the hot gas rising from below. The plume expands and dissipates by the drawing in of the gas to give a thermal mixing region 111 in which all the gas and powder pass through each other in a counterflow pattern so that the powder extracts heat from the gas as it falls.

In the mixing region, there is a degree of entrainment of particles in the rising gas, so that the ideal counterflow of gas and solids is only approximately achieved. It is not desirable that the turbulence is too high such that the mixing zone acts as a completely stirred system which would limit the thermal efficiency of the heat exchanger, nor should the turbulence be too low that the gas lifts the powder out of the reactor. The particle size distribution, the velocity of the gas, and the velocity of plume entry and the length of the mixing zone are the critical design parameters. If the plume entry velocity is too high, the plume will not break-up sufficiently quickly that the mixing zone length becomes too small. If the gas velocity is too high, the recirculation in the mixing zone is too strong and the counterflow thermal efficiency is lost.

In this embodiment, the particles entrained in the rising gas are knocked out of the gas flow by using a vortex breaker 112, which is a set of plates which, by themselves, filter the particle by virtue of the low gas velocities at the plate surfaces, followed by an internal cyclone created by a tangential outlet tube 113 of the gas. The design of this system is to minimise the fraction of particles that are entrained in the gas, so that the particle mass fraction is preferably less than 7% of the input flow, and to ensure that the cyclonic flows induced by the tangential outlet minimally disturbs the plume. The powder ejected from these systems fall back into the reactor, so that the hold-up in the heat exchanger increases, assisting in the formation of the counterflow conditions. The heated powder 114 accumulates at the base of the system and is ejected using a valve 115.

The valve system injecting the solids may minimise pulsations in the flow of particles down the injector tube. The entry velocity of the plume can be controlled by a mixer plate in the injector tube that resets the plume velocity. The plume can be forced to dissipate at a point in the tube using a deflector cone in the tube which deflects the powder towards the walls of the pipe.

As a typical example, for heat exchanger that is used to preheat 5 tonnes/hr of powder with a mean particle size of 40 microns, by 5 tonnes/hr of gas, the velocity of the particles at the base of the injector tube is about 3.0 m/s and the velocity of the rising gas is about 0.2 m/s. The gas superficial velocity sets the pipe diameter, and may be about 1.0-2.0 m. The length of the plume is preferably between 1 m to 2 m, and the length of the mixing zone is preferably between 4 m to 8 m. The loss of particles at the gas exhaust is about 4%, but may be in the range of 0.1% to 8%.

It is observed that the plume is easily broken up by small asymmetries in the flow. Thus, the use of vortex plates to minimise the impact of the cyclone gas flow pattern induced the tangential gas exhaust, on the plume. The detailed design of the gas diffuser tube is also important in that regard. The perturbation of the streamers formed by the plume is deleterious and it to be minimised. This sensitivity can be used to design the heat exchanger by controlling the plume properties.

The example embodiment of FIG. 1 also applies to the example where a hot powder is cooled by an ambient gas stream with only slight modifications of the dimensions to account for the temperature dependences of the physical and chemical properties of the process streams.

Figure 2:
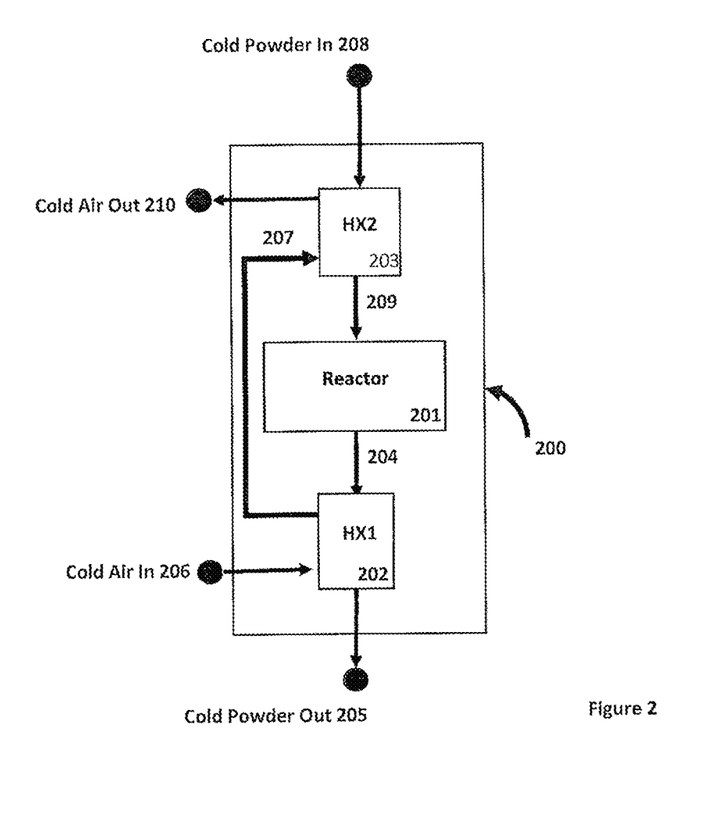
FIG. 2 illustrates a schematic of a reactor system for reactions wherein the heat exchange processes are carried out by two powder-gas heat exchange subsystems to recuperate heat for a thermally efficient reactor.

The example embodiment of FIG. 2 is a reactor system 200 for pyro-processing a powder. The reaction in system 200 does not produce a significant process gas stream and any combustion gases are considered as a separate process stream. The system comprises a reactor subsystem 201 and two powder-gas heat exchange subsystems 202 and 203 of the design described herein by the first example embodiment. The hot powder 204 is injected into the first powder-gas heat exchanger subsystem 202 where the powder is cooled to give a cold powder product 205 by the injection of a cold gas stream 206 which is heated to give a hot air stream 207. This hot air stream can be injected into the second powder gas heat exchanger subsystem 203 where it is used to preheat the input power stream 208 to give a hot powder stream 209, which is injected into the reactor subsystem, and a cool gas stream 210. This system would be deployed in a reactor in which the mass of volatiles lost in the reactor subsystem was small, so that the mass flow of powder out 204 is approximately the same as the mass flow of powder in 209. Thus for optimum heat exchange, the mass flow of air would be the same, or substantially the same, in each heat exchanger subsystem, as shown in FIG. 2. This is largely independent of the output temperature of the reactor powder flow 204. The thermal efficiency of the reactor 200 would be determined by the residual sensible heat in the cooled powder 205 from the first heat exchanger 202 and the cooled gas 210 from the second heat exchanger 203, and any heat losses from the subsystems. Of course, there may be a limitation on the input temperature of the powder flow 209 into the reactor, for example, where the reaction may undesirably commence in the heat exchanger subsystem 203. In this situation, a fraction of the heated gas 207 may be used in this heat exchanger, and the other fraction many be used in the plant, for example, to produce electrical power.

Figure 3:
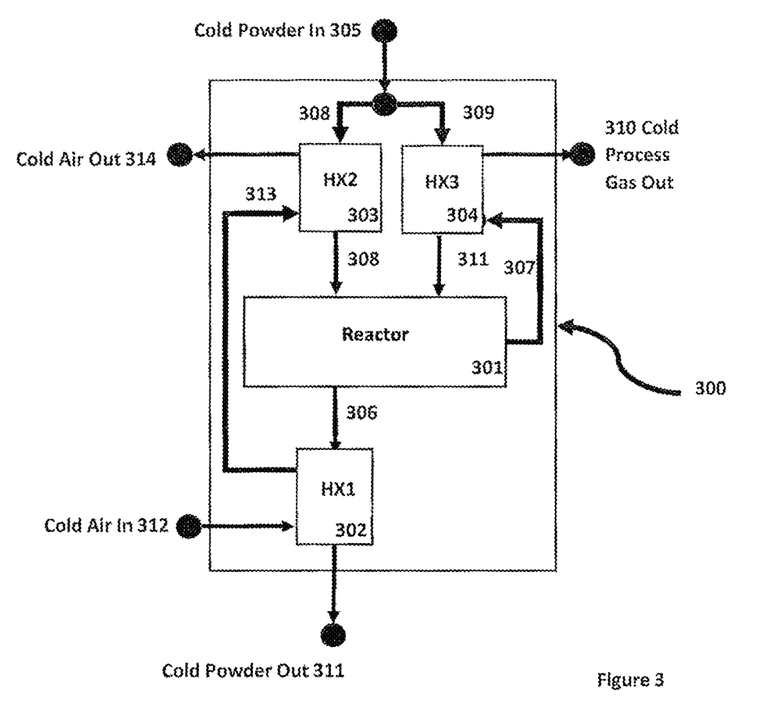
FIG. 3 illustrates a schematic of a reactor system for reactions wherein the heat exchange processes are carried out by three powder-gas heat exchange subsystems to recuperate heat for a thermally efficient reactor.

The example embodiment of FIG. 3 is a reactor system 300 for a reaction process in which the reaction generates a significant mass flow of hot gas. The system comprises the reactor subsystem 301 and three powder-gas heat exchange sub-systems, 302, 303 and 304 of the design described in the first embodiment for heat recuperation. The mass flow of the solids into the reactor 305 is split between the hot solids output 306 and hot gas output 307. In this case, the solids input 305 is split into flows 308 and 309 so that the mass flow of cold powder 309 into the heat exchanger subsystem 304 is matched to the mass flow of hot gas 307 from the reactor subsystem, to give a cold gas stream output 310, and a hot solids stream 311 for injection into the reactor subsystem. The remaining cold solids stream 308 is preheated using the same approach as described in the second embodiment of FIG. 2, using the hot air stream 313 from the powder gas heat exchanger subsystem 302 which is used to cool the hot powder stream 306 using a cool air stream 312. The thermal efficiency of this reactor is determined by the residual sensible heat in the cold powder output 311, the cold process gas stream 310 and the cold air stream 314 from the powder-gas heat exchanger subsystem 303, as well as heat losses in the subsystems. By using this split feed approach, all of the heat exchangers operate on the principle that the solids and gas mass flows in each heat exchanger are approximately the same, so that each heat exchanger can operate with the optimum heat exchange efficiency.

Many reactors have other gas and solids inputs, such as required for combustion and in many cases the combustion exhaust gas is mixed with the process exhaust gas. In such cases, there is a general need to preheat the air into the combustion gas.

Figure 4:
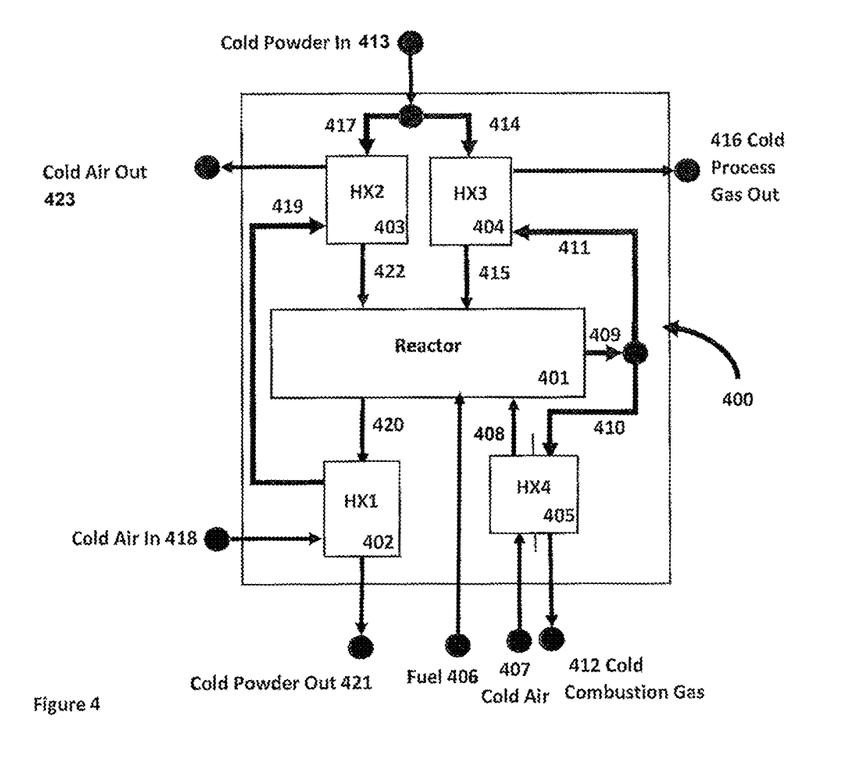
FIG. 4 illustrates a schematic of a reactor system for reactions wherein the heat exchange processes are carried out by three powder-gas heat exchange subsystems and one gas-gas heat exchange subsystem, to recuperate heat for a thermally efficient reactor.

The example embodiment of FIG. 4 is a reactor system 400 for a reaction process in which the reaction generates a significant mass flow of hot gas and consumes energy from a combustion gas that is mixed with the process gas. The system comprises the reactor subsystem 401, three powder-gas heat exchange sub-systems, 402, 403 and 404 of the design described in the first embodiment for heat recuperation, and a gas-gas heat exchanger that is used to preheat the combustion gas. The fuel of the combustion 406 is not preheated and is injected into the reactor subsystem, while the cold air 407 for combustion is preheated in the gas-gas heat exchanger 405 to give a hot air 408 which is injected into the reactor subsystem for combustion. The gas exhaust 409 from the reactor subsystem is split into streams 410 and 411, where the stream 410 is preferably in the mass ratio of the combustion gas, approximated by the mass flow of 407 and 406, to the total gas mass flow 409, and is used to preheat the air 407 in the gas-gas heat exchanger 405 to give a cold combustion gas steam 412. Thus the mass flow of hot gas in 411 is comparable to the process gas mass flow, equal to the difference of the sum of the powder inputs 415 and 422 shown in FIG. 4.

The remaining mass flows in FIG. 4 follow the same process as described in FIG. 3, with the input solids 413 being split in the proportions of the process gas, approximated by the mass flow of 411, and the hot powder exhaust 420. The hot gas stream 411 is used in the powder-gas heat exchanger subsystem 404 to preheat heat the powder flow 414 to the hot powder stream 415 for injection into the reactor. The second cold powder stream 417 is preheated in the powder-gas heat exchanger subsystem 403 to give a hot powder stream 422 for injection into the reactor subsystem, where the powder heating is accomplished by the hot air steam 419 from the powder-gas heat exchanger subsystem 402, which cools the powder stream 420 from the reactor subsystem 401 using the cool air stream 418 to give the cool powder stream 421. The thermal efficiency thermal efficiency of this reactor is determined by the residual sensible heat in the cold powder output 421, the cold combustion/process gas streams 412 and 416, and the cold air stream 423 from the powder-gas heat exchanger subsystem 403, as well as heat losses in the subsystems. By using this split feed approach, all of the heat exchangers operate on the principle that the solids and gas mass flows in each heat exchanger are approximately the same, so that each heat exchanger can operate with the optimum heat exchange efficiency.

In another embodiment, the application of the powder-gas heat exchanger to the production of Portland Cement also uses the approach described by Sceats et al (WO2015/077818) (incorporated herein by reference), which uses an indirect heating of the calciner to capture the process $CO_2$ from the calcination of limestone in the raw cement meal. The process described therein uses flameless combustors, which have internal heat recuperation, and use a counterflow of downwards flow of the cement meal and the rising $CO_2$ gas stream. The means for recuperation of heat in this process, when integrated into the cement production process is illustrated in FIG. 5.

Figure 5:
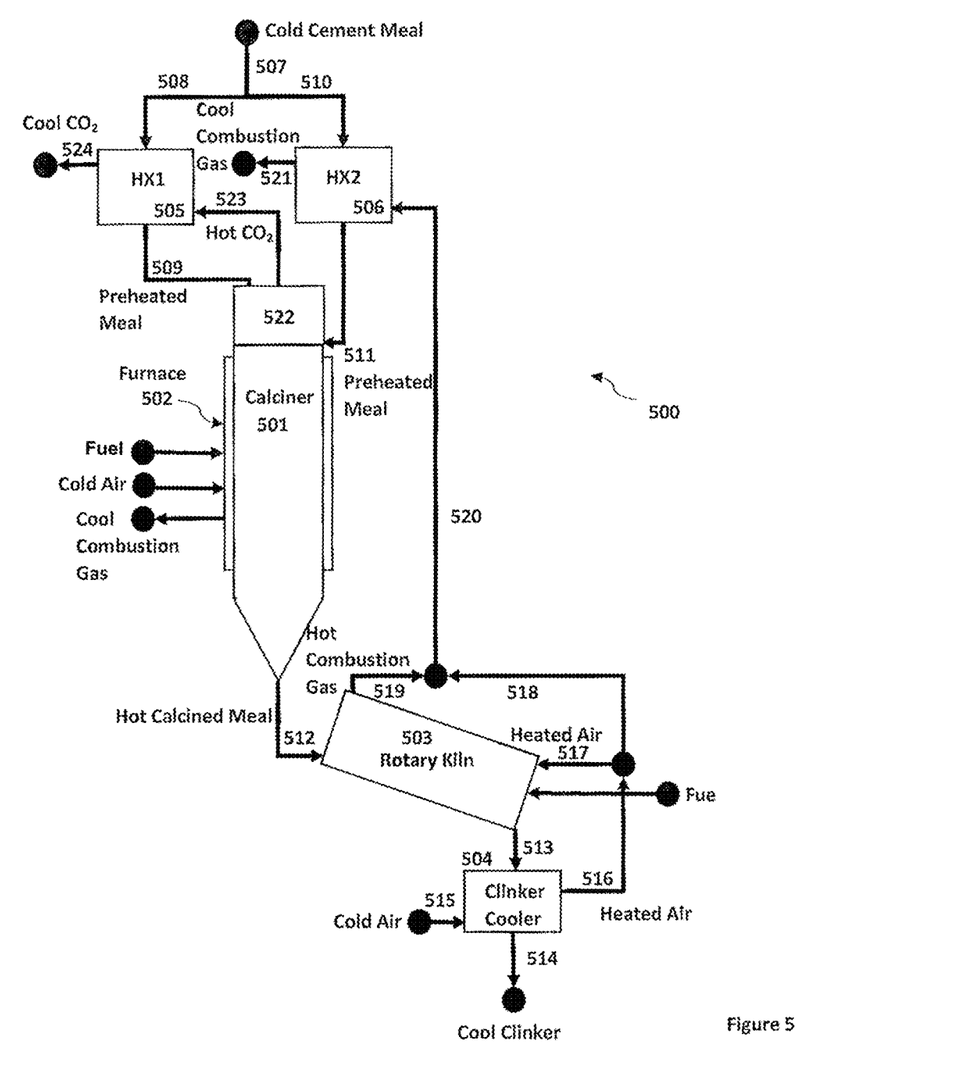
FIG. 5 illustrates a schematic of a system to produce Portland Cement which may be suitable for the use with the present invention.

As shown in FIG. 5, the cement plant 500 comprises a calciner subsystem 501, which is externally heated in a furnace subsystem 502 to calcine the limestone fraction of the raw cement meal powder for injection into the rotary kiln 503, and the hot clinker nodules are cooled in the clinker cooler 504. There are two powder-gas heat exchangers 505 and 506 that are used in this process. The raw cement meal 507 is split into two stream 508, used for cooling the $CO_2$ gas stream from the calciner to generate a preheated powder 509 in the powder-gas heat exchanger 505; and the stream 510 which is used for cooling an air/combustion gas stream from the rotary kiln, to generate a preheated powder stream 511 for injection into the calciner. In this example, flameless combustion burners, with integrated air preheaters, are used to power the furnace, so that there is minimal energy in the combustion gas from the calciner.

The extraction of additional low-grade heat from this gas stream is not considered in this embodiment. The powder at the base of the calciner has reacted to give the active ingredient lime at about 900° C., and is injected as calcined cement meal 512 into the rotary kiln which further heats the powder to about 1400° C. to form clinker nodules, that are exhausted from the kiln as a granular flow 513. The granules are cooled in the clinker cooler to give cool clinker flow 514 by a cold air stream 515, usually at ambient temperature. The hot air stream 516 is split to provide preheated air 517 for the kiln burner, and the excess air 518 is recombined with the exhaust from the kiln 519 to give a hot air/combustion gas stream 520 that is injected into the powder-gas preheater 506 to give a cooled gas stream 521 and the preheated solids stream 511. To a reasonable approximation, the mass flow of clinker 514 is about equal to the mass flow of air 516, which is about equal to the mass flow of the mixed air/combustion gas 520. The mass of fuel will increase the mass flow to a small extent. Therefore, the split of the input cement meal stream into the flows 508 and 509 based on the mass flow of $CO_2$, as described above will give a high thermal efficiency. However, the requirement to add additional heat in the rotary kiln means that the sensible heat in 520 exceeds that of 523 on a mass weighted basis.

As a consequence, the powder 509 will be at a lower temperature than 511. To maintain the thermal efficiency, it is desirable that the hottest powder 501 is injected into the Calciner at a lower point than 509, as shown by the segment 522 in FIG. 5. The means of doing this is described below in the embodiment shown in FIG. 6. In practical terms the split between the flows and the injection point of the hottest powder can be optimised so that the sensible heat in the cool clinker powder 514, the cool $CO_2$ stream 524 and the cool air/combustion stream 521 is minimised. The energy efficiency depends on the thermal efficiency of the clinker cooler, the two powder-gas heat exchangers and the thermal efficiency of the calciner combustor, including heat losses from all the subsystems and pipes.

Figure 6:
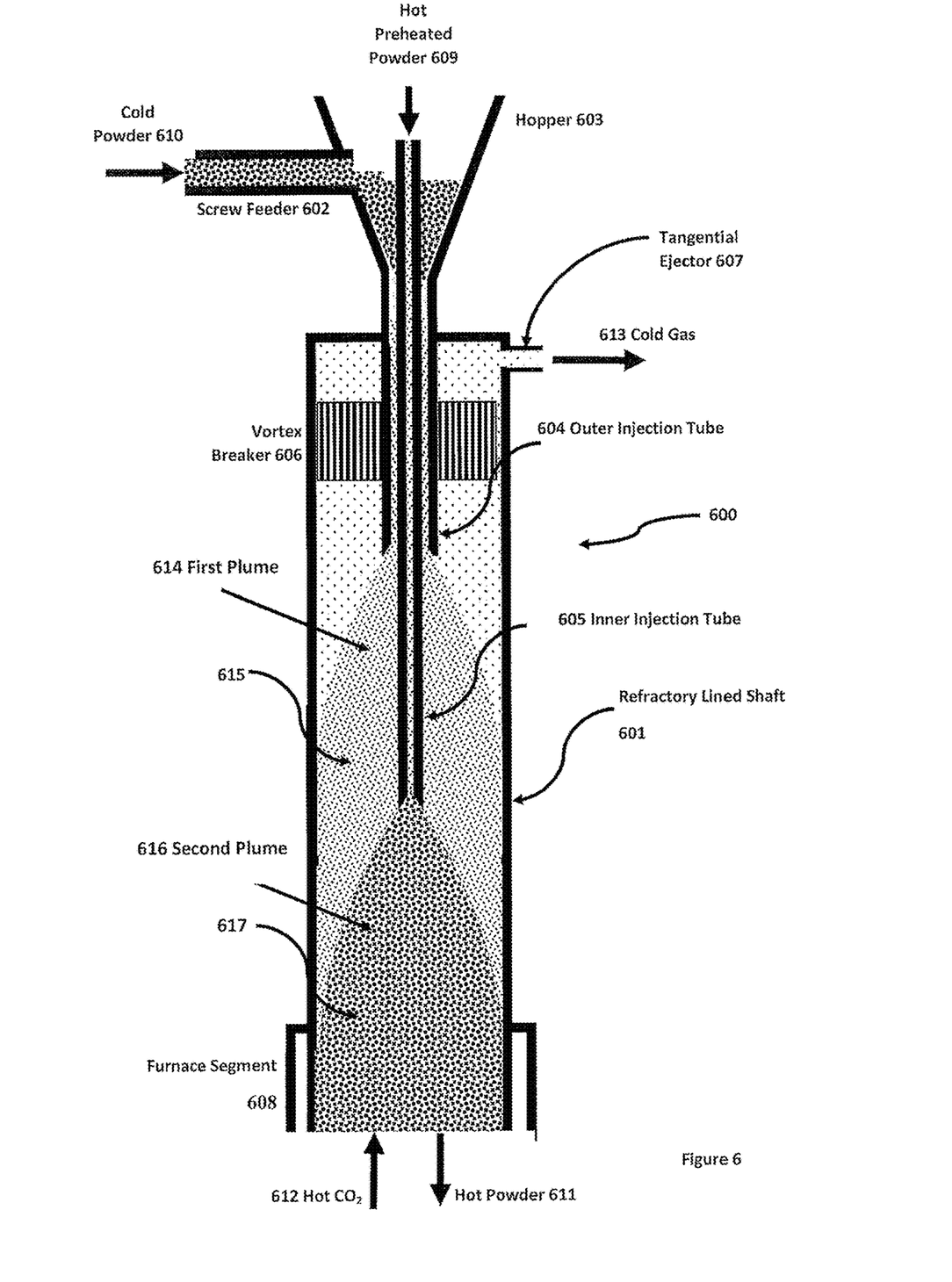
FIG. 6 illustrates a schematic of an embodiment of a powder-gas heat exchange system for introducing two preheated gas streams into a reactor as a particular example of the present disclosure of the first aspect.

The example of embodiment of FIG. 6 discloses a means of preheating solids in a reactor, that may be applicable to the process disclosed in the example embodiment of FIG. 5 for Portland Cement, in which one powder stream is preheated by a hot gas stream from a first process, such as the rotary kiln of FIG. 5, and a second powder stream is preheated by a hot gas stream from a second process, such as the calciner of FIG. 5, into which both preheated solids streams are injected. In this example embodiment there are two powder feeds. The powder-gas preheater system 600 comprises a refractory lined shaft 601; and a screw feeder 602, a hopper 603, and an outer injection tube 604, for the injection of a first powder stream; and an inner injection tube 605 for injection of a second powder stream which extends beyond the tube 604; and for extraction of the process gas from the reactor a vortex breaker 606 and a tangential gas ejector 607. The mixed powder stream enters the reactor at the point where an external furnace indirectly heats the powder falling through the reactor from the shaft. The input streams are the hot preheated powder 609 that comes from a separate powder-gas preheater in which the heating is from a hot air/combustion process; and the second powder stream 610. In the case of Portland Cement, the first powder stream would preferably be at about 750° C., and the second powder stream would preferably be at ambient temperature. The powder-gas heat exchanger system disclosed herein exhausts a hot preheated powder stream 611 downwards into the reactor system, and the gas exhaust stream 612 is $CO_2$. The objective of the powder-gas heat exchanger is to deliver a cool $CO_2$ gas stream 613.

In the case of Portland Cement, the $CO_2$ gas stream is about 35% by weight of the input powder stream so that the mass flow of cold powder 610 is about 35% of the total powder flow, with 65% of the powder flow being preheated by the hot air/combustion gas as described above. The cold powder flow is injected into the powder-gas heat exchanger by the outer injection tube so that a plume 614 and counterflow mixing zone 615 is developed as described in the embodiment of FIG. 1, The plume evolution is perturbed by the presence of the inner injection tube 605. The preheated powder 609 is injected by the inner injection tube to a point below the mixing zone 615, and forms a second plume 616 and a mixing zone 617, with the falling preheated powder from the zone above to give, after mixing, the downflow of preheated powder 611. The principle established by this example embodiment is that split feed with separate preheaters can be integrated into an input into a reactor which can deliver an efficient heat transfer. In this case, the very high thermal energy in the preheated powder 609 requires it to be injected deeper into the reactor so that it does not reheat the $CO_2$ gas coming from the reactor. The velocity of this powder entering the reactor may be controlled by the use of deflector plates in or below the inner injection tube.

It will be recognised by a person skilled in the art that modifications of the process flows of embodiments 2, 3 and 4 may be varied to account for other factors, such as fouling and environment emissions requirements.

In another embodiment, the present disclosure may be directed towards a method for efficiently and continuously exchanging heat between a falling powder stream a rising gas stream of about equal mass flow rates in a vertical shaft heat exchange system. This method may be used to either cool a hot solids stream by a cool gas stream, generally air, or to heat a cool solids stream by a hot gas stream, which may generally be either hot air stream or a hot gas stream from a process. Further, the mass flow of the powder and the mass flow of the gas may be in the proportion of 1:1, or more preferably in proportion to the heat-capacity weighted mass flows.

Optionally, the powder-gas heat exchange system comprising stages within the shaft to achieve a substantially counter-current flow of the streams. The powder-gas heat exchange system comprises at least one of the following segments or apparatuses;
    a. a powder injector stage in which the powder is injected at the top of the shaft through a pipe so as to produce a falling plume of powder in the system; and
    b. a gas injector stage in which the gas is injected near the base of the shaft in a diffuser tube so as to create a rising gas stream; and
    c. a plume spreader stage comprising a first length of the shaft in which the plume from the injector stage spreads across the shaft; and
    d. a mixing stage in which the particles from the plume spreader stage and gas from the gas injector stage flow intimately to exchange heat; and
    e. a powder hopper stage at the base of the reactor in which the particles falling past the gas injector stage accumulate as a powder, and from which the powder is exhausted from the system by a valve; and
    f. a separator stage at the top of the tube which substantially separates the gas from any entrained solids, and which reinjects said solids downwards into the tube, and which allows the gas to exhaust from the reactor in a manner which does not substantially impact on the spread of the plume below.

The velocity of the powder entering the powder-gas heat exchange system from the powder injector stage, and the velocity of the rising gas from the gas injector stage are selected such that the recirculation of the particles in the mixing stage is minimised, such that the flows in the mixing stage are substantially an intimate counterflow of these two streams.

A reactor system for processing powders which uses two of more of the powder-gas heat exchange systems to recover heat from the exhaust streams from one or more reactor stages and using this heat to preheat the input powder stream to optimise the thermal energy efficiency of the reactor stages.

Optionally, the reaction does not generate a substantial process gas stream and combustion gas is not injected into the reactor stages, comprising:
    a. A first powder-gas heat exchange system to cool the hot powder from a reactor stage with a cool gas stream, generally ambient air; and
    b. A second powder-gas heat exchange system injecting the output hot gas stream from the first powder-gas heat exchange system, to preheat the cool powder for injection into the reactor stages as a preheated powder stream.

Preferably, reaction generates a substantial process gas stream and combustion gas is not injected into the reactor stages, comprising:
    a. A first powder-gas heat exchange to cool the hot powder from a reactor stage with a cool gas stream;
    b. A means of separating the cool powder feed into a first and second cool powder input stream, in which the mass flow of the first cool input powder stream is preferably in proportion of the mass flow of hot powder exhaust to the hot powder and hot gas streams from the reactor stages, or more preferably in the proportion of the heat capacity weighted mass flow of hot powder exhaust to the heat capacity weighted hot powder and hot process gas streams;

c. A second powder-gas heat exchange system in which the output hot gas stream from the first powder-gas heat exchange system is used to preheat the first cool input powder stream for injection into the reactor stage as a preheated powder stream d. A third powder-gas heat exchange system in which the hot process gas output stream from the reactor stage is used to preheat the second cool input powder stream for injection into the reactor stage as a preheated powder stream.

Preferably, the reaction generates a substantial process gas stream and combustion gas is injected into the reactor stages, comprising:

a. A first powder-gas heat exchange system to cool the hot powder from the reactor stage with a cool gas stream;

b. A means of separating the mixed hot process and combustion gas stream from the reactor stages into a first and second hot gas stream in which the mass flow of the first hot gas stream is preferably in proportion of the mass flow of the process gas generated in the reactor to the mass flow of the total gas stream from the reactor stage, or more preferably in the proportion of the heat capacity weighted mass flow of the process gas to the heat capacity weighted total gas stream from the reactor stages;

c. A means of separating the cool powder feed into a first and second cool powder input stream, in which the mass flow of the first cool input powder stream is preferably in proportion of the mass flow of hot powder exhaust to the hot powder and hot process gas streams from the reactor stages, or more preferably in the proportion of the heat capacity weighted mass flow of hot powder exhaust to the heat capacity weighted hot powder and hot process gas streams;

d. A second powder-gas heat exchange system in which the output hot gas stream from the first powder-gas heat exchange system is used to preheat the first cool input powder stream for injection into the reactor stages as a preheated powder stream.

e. A third powder-gas heat exchange system in which the first hot gas stream from the reactor stages is used to preheat the second cool input powder stream for injection into the reactor stages as a preheated powder stream.

f. A gas-gas heat exchange system in which the air for the combustion process is preheated by the second hot gas stream from the reactor stages.

The reactor system in which any of the powder-gas heat exchange systems may be incorporated within any of the reactor stages discussed herein. It will be appreciated that the reactor system may be applied to the production of Portland cement.

Further forms of the invention will be apparent from the description and drawings.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The invention claimed is:

1. A reactor for exchanging heat between a powder stream and a gas stream in counter-current flow, the reactor being configured such that a mass flow rate associated with the powder stream is substantially equal to a mass flow rate associated with the gas stream in a vertical shaft heat exchanger, wherein the reactor comprises:

a first powder-gas heat exchanger configured to cool a hot powder from a reactor stage of one or more reactor stages included in the reactor as a part of a reaction with a cool gas stream implemented in the reactor; and a second powder-gas heat exchanger, configured to inject an output hot gas stream from the first powder-gas heat exchanger, to preheat a cool powder for injection into the one or more reactor stages as a preheated powder stream, wherein each of the first and second powder-gas heat exchanger comprises:

a powder injection stage wherein a powder is injected at a top of a vertical shaft so as to produce a falling stream of powder in the heat exchanger;

a gas injection stage wherein a gas is injected near a base of the vertical shaft in a diffuser tube so as to create a rising gas stream;

a powder disperse stage comprising a first length of the vertical shaft in which the powder from the powder injection stage disperses across the vertical shaft;

a mixing stage wherein powder from the powder disperse stage and gas from the gas injection stage flow in contact to exchange heat;

a powder hopper stage at a base of the heat exchanger wherein powder falling past the gas injection stage accumulates as a powder waste product, wherein the powder waste product is exhausted from the heat exchanger by a valve; and a separation stage at a top of the diffuser tube configured to substantially separate the gas injected at the base of the vertical shaft from any entrained solids, wherein the solids are reinjected in a vertically-downward direction into the diffuser tube, wherein the gas exhausts from the reactor in a manner which does not substantially impact the dispersal of the powder below, wherein an entrance velocity of the powder from the powder injection stage, and a velocity of the rising gas from the gas injection stage are selected to minimise recirculation of powder particles in the mixing stage, such that the falling powder stream and the rising gas stream are substantially in contacting counterflow in the mixing stage; wherein the reactor is configured to process the powder;

the reactor is configured to recover heat from an exhaust stream from one or more reactor stages, and use the heat to preheat an input powder stream to optimise a thermal energy efficiency of the one or more reactor stages; and the reaction does not generate a process gas stream, and combustion gas is not injected into either a first reactor stage or a second reactor stage of the one or more reactor stages.

2. The reactor of claim 1, wherein the reactor further includes a reactor hot gas stream adapted for use in heating a reactant cool solids stream in the second powder-gas heat exchanger to generate a reactor hot solids stream, and a reactor cool gas stream adapted for use in cooling the reactor hot solids stream after the reactor hot solids stream has been processed by the one or more reactor stages, to generate a product cool solids stream in the first powder-gas heat exchanger, wherein the reactor cool gas stream is converted into the reactor hot gas stream after a heat exchange process in the first powder-gas heat exchanger.

3. The reactor of claim 1, wherein the reactor further comprises;
   a split feeder configured to separate the cool powder feed into a first and second cool powder input stream, wherein a mass flow of the first cool input powder stream is in proportion to a mass flow of a hot powder exhaust of a hot powder and the hot gas stream.

4. The reactor of claim 3, wherein the reactor further comprises;
   a third powder-gas heat exchanger, wherein a first hot gas stream from the one or more reactor stages is used to preheat the second cool input powder stream for injection into the one or more reactor stages as a preheated powder stream.

5. The reactor of claim 1, wherein each of the first and second powder-gas heat exchangers includes any combination of the one or more reactor stages.

6. The reactor of claim 1, wherein the reactor is configured to produce Portland cement.

7. The reactor of claim 2, wherein the reactor cool gas stream comprises air.

* * * * *